United States Patent
Ferguson et al.

(10) Patent No.: US 11,551,278 B2
(45) Date of Patent: Jan. 10, 2023

(54) SYSTEMS AND METHODS FOR A MIXED FLEET TRANSPORTATION SERVICE

(71) Applicant: Nuro, Inc., Mountain View, CA (US)

(72) Inventors: David Ferguson, San Francisco, CA (US); Jiajun Zhu, Palo Alto, CA (US); Cosimo Leipold, Washington, DC (US); Pichayut Jirapinyo, San Francisco, CA (US)

(73) Assignee: NURO, INC., Mountain View, CA (US)

( * ) Notice: Subject to any disclaimer, the term of this patent is extended or adjusted under 35 U.S.C. 154(b) by 82 days.

(21) Appl. No.: 16/159,047

(22) Filed: Oct. 12, 2018

(65) Prior Publication Data

US 2019/0050807 A1 Feb. 14, 2019

Related U.S. Application Data

(63) Continuation-in-part of application No. PCT/US2018/044361, filed on Jul. 30, 2018.
(Continued)

(51) Int. Cl.
*G06Q 10/08* (2012.01)
*G06Q 30/06* (2012.01)
(Continued)

(52) U.S. Cl.
CPC ............ *G06Q 30/0631* (2013.01); *A23L 2/52* (2013.01); *A23L 5/00* (2016.08); *A23L 7/109* (2016.08);
(Continued)

(58) Field of Classification Search
CPC ...... G06Q 10/02; G06Q 50/30; G06Q 20/322; G06Q 20/3224; G06Q 10/06;
(Continued)

(56) References Cited

U.S. PATENT DOCUMENTS

| | | | |
|---|---|---|---|
| 10,303,171 B1 * | 5/2019 | Brady | G08G 1/207 |
| 10,308,430 B1 * | 6/2019 | Brady | G05D 1/0027 |

(Continued)

OTHER PUBLICATIONS

Muoio, Danielle, "How to hail a self-driving Uber if you're in Pittsburgh", Business Insider, https://www.businessinsider.com/how-to-hail-a-driverless-uber-car-in-pittsburgh-2016-9, Sep. 14, 2016, retrieved Feb. 20, 2019): (Year: 2016).*
(Continued)

*Primary Examiner* — Resha Desai
*Assistant Examiner* — Michelle E Carey

(57) ABSTRACT

Systems and methods are disclosed for providing transportation or delivery services using a fleet of mixed vehicles. A computer-implemented method of providing services using a fleet of mixed vehicles includes receiving at a server a request for a service, determining parameters for the service, selecting by the server a vehicle from a fleet of mixed vehicles to perform at least a portion of the service based on the determined parameters, and transmitting a message to the selected vehicle to perform the at least a portion of the service. The fleet of mixed vehicles includes at least two of: a semi-autonomous vehicle, a fully-autonomous vehicle, a vehicle remotely operated by a human, or a human driven vehicle.

20 Claims, 11 Drawing Sheets

Related U.S. Application Data

(60) Provisional application No. 62/538,538, filed on Jul. 28, 2017.

(51) Int. Cl.

| | | |
|---|---|---|
| *G08G 1/04* | (2006.01) | |
| *B60P 3/00* | (2006.01) | |
| *B60R 21/34* | (2011.01) | |
| *B65G 67/24* | (2006.01) | |
| *G01C 21/34* | (2006.01) | |
| *G05D 1/00* | (2006.01) | |
| *G05D 1/02* | (2020.01) | |
| *G05D 1/12* | (2006.01) | |
| *G06K 7/10* | (2006.01) | |
| *G06Q 10/06* | (2012.01) | |
| *G06Q 50/12* | (2012.01) | |
| *G06Q 50/28* | (2012.01) | |
| *G08G 1/00* | (2006.01) | |
| *H04L 67/12* | (2022.01) | |
| *G06N 20/00* | (2019.01) | |
| *B60R 25/25* | (2013.01) | |
| *A23L 5/00* | (2016.01) | |
| *A23L 7/109* | (2016.01) | |
| *G06F 16/955* | (2019.01) | |
| *A23L 2/52* | (2006.01) | |
| *A47J 37/06* | (2006.01) | |
| *A47J 47/00* | (2006.01) | |
| *B60H 1/00* | (2006.01) | |
| *B60P 1/36* | (2006.01) | |
| *B60P 3/025* | (2006.01) | |
| *B60R 19/18* | (2006.01) | |
| *G06K 7/14* | (2006.01) | |
| *G06K 19/06* | (2006.01) | |
| *G06Q 20/00* | (2012.01) | |
| *G06Q 20/12* | (2012.01) | |
| *G06Q 20/18* | (2012.01) | |
| *G07F 17/00* | (2006.01) | |
| *G07F 17/12* | (2006.01) | |
| *G07C 5/02* | (2006.01) | |
| *G07C 5/08* | (2006.01) | |
| *G06V 20/56* | (2022.01) | |
| *G06V 20/64* | (2022.01) | |
| *G06Q 30/02* | (2012.01) | |
| *G06Q 50/30* | (2012.01) | |
| *G06K 19/07* | (2006.01) | |
| *H04W 4/024* | (2018.01) | |
| *H04W 4/40* | (2018.01) | |
| *G01C 21/20* | (2006.01) | |
| *B60R 19/48* | (2006.01) | |
| *G06F 3/0484* | (2022.01) | |
| *B60R 21/36* | (2011.01) | |
| *H04N 5/76* | (2006.01) | |
| *H05B 6/68* | (2006.01) | |

(52) U.S. Cl.
CPC ........... *A47J 37/0658* (2013.01); *A47J 47/00* (2013.01); *B60H 1/00364* (2013.01); *B60H 1/00735* (2013.01); *B60P 1/36* (2013.01); *B60P 3/007* (2013.01); *B60P 3/0257* (2013.01); *B60R 19/18* (2013.01); *B60R 19/483* (2013.01); *B60R 21/34* (2013.01); *B60R 25/25* (2013.01); *B60R 25/252* (2013.01); *B65G 67/24* (2013.01); *G01C 21/20* (2013.01); *G01C 21/343* (2013.01); *G01C 21/3438* (2013.01); *G01C 21/3453* (2013.01); *G05D 1/0027* (2013.01); *G05D 1/0033* (2013.01); *G05D 1/0038* (2013.01); *G05D 1/0061* (2013.01); *G05D 1/0088* (2013.01); *G05D 1/0094* (2013.01); *G05D 1/0212* (2013.01); *G05D 1/0214* (2013.01); *G05D 1/0223* (2013.01); *G05D 1/0231* (2013.01); *G05D 1/0276* (2013.01); *G05D 1/0291* (2013.01); *G05D 1/12* (2013.01); *G06F 16/955* (2019.01); *G06K 7/10297* (2013.01); *G06K 7/10722* (2013.01); *G06K 7/1413* (2013.01); *G06K 19/06028* (2013.01); *G06K 19/0723* (2013.01); *G06N 20/00* (2019.01); *G06Q 10/0631* (2013.01); *G06Q 10/0635* (2013.01); *G06Q 10/06315* (2013.01); *G06Q 10/08* (2013.01); *G06Q 10/083* (2013.01); *G06Q 10/0832* (2013.01); *G06Q 10/0833* (2013.01); *G06Q 10/0834* (2013.01); *G06Q 10/0835* (2013.01); *G06Q 10/0837* (2013.01); *G06Q 10/08355* (2013.01); *G06Q 20/00* (2013.01); *G06Q 20/127* (2013.01); *G06Q 20/18* (2013.01); *G06Q 30/0265* (2013.01); *G06Q 30/0266* (2013.01); *G06Q 30/0645* (2013.01); *G06Q 50/12* (2013.01); *G06Q 50/28* (2013.01); *G06Q 50/30* (2013.01); *G06V 20/56* (2022.01); *G06V 20/64* (2022.01); *G07C 5/02* (2013.01); *G07C 5/08* (2013.01); *G07F 17/0057* (2013.01); *G07F 17/12* (2013.01); *G08G 1/04* (2013.01); *G08G 1/202* (2013.01); *H04L 67/12* (2013.01); *H04W 4/024* (2018.02); *H04W 4/40* (2018.02); *A23V 2002/00* (2013.01); *B60R 21/36* (2013.01); *B60R 2021/346* (2013.01); *G05D 2201/0207* (2013.01); *G05D 2201/0213* (2013.01); *G06F 3/0484* (2013.01); *G08G 1/22* (2013.01); *H04N 5/76* (2013.01); *H05B 6/688* (2013.01)

(58) Field of Classification Search
CPC ........... G06Q 30/0261; G06Q 30/0269; G06Q 10/08; G06Q 30/0639; G06Q 50/28; G06Q 10/083; G06Q 10/0835; G06Q 10/08355; G06Q 10/0836; G06Q 10/087; G06F 16/954; B60P 3/0257
See application file for complete search history.

(56) References Cited

U.S. PATENT DOCUMENTS

| | | | |
|---|---|---|---|
| 2010/0084426 A1 | 4/2010 | Devers et al. | |
| 2014/0081445 A1 | 3/2014 | Villamar | |
| 2014/0358353 A1* | 12/2014 | Ibanez-Guzman | G05D 1/0027 701/23 |
| 2015/0006005 A1* | 1/2015 | Yu | G06Q 10/08 701/22 |
| 2015/0235304 A1* | 8/2015 | Vincent | G06Q 30/0641 705/14.23 |
| 2016/0334229 A1* | 11/2016 | Ross | G01C 21/34 |
| 2017/0174343 A1 | 6/2017 | Erickson et al. | |
| 2017/0227371 A1* | 8/2017 | O'Mahony | G08G 1/202 |
| 2018/0260778 A1 | 9/2018 | Mazetti et al. | |
| 2018/0349872 A1* | 12/2018 | Ahmed | G06Q 20/20 |
| 2019/0112119 A1* | 4/2019 | Alexander | B65D 25/06 |

OTHER PUBLICATIONS

Hern, Alex, Ocado's self-drive vehicle makes deliveries in first UK trials, Jun. 27, 2017, https://www.theguardian.com/business/2017/jun/27/ocados-self-drive-vehicle-makes-deliveries-in-first-uk-trials (Year: 2017).*

(56) References Cited

OTHER PUBLICATIONS

Notification of Transmittal of the International Search Report and the Written Opinion of the International Search Authority, or the Declaration issued in PCT application No. PCT/US2018/044361 dated Oct. 10, 2018, 12 pages.

* cited by examiner

SYSTEMS AND METHODS FOR A MIXED FLEET TRANSPORTATION SERVICE

CROSS-REFERENCE TO RELATED APPLICATIONS

The present application is a continuation-in-part of International Application No. PCT/US2018/044361, filed on Jul. 30, 2018, which claims the benefit of U.S. Provisional Application No. 62/538,538, filed on Jul. 28, 2017. The entire contents of each of the foregoing applications are hereby incorporated by reference.

FIELD OF THE TECHNOLOGY

The present application relates to autonomous vehicles, and in particular, to systems and methods for a mixed fleet transportation service.

BACKGROUND

The field of fully-autonomous and/or semi-autonomous robots is a growing field of innovation. Robots are being used for many purposes including warehouse inventory operations, household vacuuming robots, hospital delivery robots, sanitation robots, and military or defense applications.

In the consumer space, handling and delivery of items by autonomous vehicles could improve society in many ways. For example, rather than spending time driving to/from a store, wandering through the store to locate desired items, and waiting on lines to pay for the items, a customer can instead engage in productive work, entertainment, and/or rest while waiting for an autonomous vehicle to deliver the items to them. Accordingly, there is continuing interest in developing technologies for handling and delivering items or for transporting passengers by autonomous robot vehicles.

SUMMARY

This disclosure relates to a fully-autonomous and/or semi-autonomous robot fleet and, in particular, to a fleet of mixed robot vehicles for transporting goods and/or making deliveries.

In accordance with aspects of the present disclosure, a computer-implemented method of providing services using a fleet of mixed vehicles includes receiving by a server a request for a service, determining parameters for the service, selecting by a server a vehicle from a fleet of mixed vehicles to perform at least a portion of the service based on the determined parameters, and transmitting a message to the selected vehicle to perform the at least a portion of the service. The fleet of mixed vehicles includes at least two of: a semi-autonomous vehicle, a fully-autonomous vehicle, a vehicle remotely operated by a human, or a human-driven vehicle.

In another aspect of the present disclosure, the parameters include at least one of: distance, location, customer's preference, vehicle type, size of a requested good, weight of a requested good, time, service-level agreement, optimal delivery route, speed limit, or weather or road conditions at, near, or en route the location of the customer receiving the service.

In an aspect of the present disclosure, the service includes transporting or delivering a good or product.

In yet another aspect of the present disclosure, the computer-implemented method further includes determining one or more paths for the selected vehicle.

In a further aspect of the present disclosure, the computer-implemented method further includes monitoring the selected vehicle performing the service.

In an aspect of the present disclosure, the computer-implemented method further includes receiving, at the server, a message that the selected vehicle has completed performing the requested service, and identifying the selected vehicle as being available for performing another requested service.

In a further aspect of the present disclosure, the computer-implemented method further includes transmitting information regarding the request for the service to a service provider.

In yet another aspect of the present disclosure, the computer-implemented method includes determining requests for services from multiple customers located near each other, and determining a path to deliver the services to the multiple customers using the selected vehicle.

In an aspect of the present disclosure, a system for providing transportation or delivery services using a fleet of vehicles is disclosed. The system includes one or more processors, a memory storing instructions, and a portal or communications interface configured to receive a request for a service and to transmit information regarding the progress of the service, where the request includes scheduling information. The instructions, when executed by the processor(s), cause the system to determine parameters for the service based on the request, select an appropriate vehicle from a fleet of vehicles to perform at least a portion of the service based on the determined parameters, and transmit a message to the selected vehicle to perform the at least a portion of the service transaction. The fleet of mixed vehicles includes at least two of: a semi-autonomous vehicle, a fully-autonomous vehicle, a vehicle remotely operated by a human, or a human-driven vehicle.

In yet another aspect of the present disclosure, the parameters include at least one of: distance, location, customer's preference, vehicle type, size of a requested good, weight of a requested good, time, service-level agreement, optimal delivery route, speed limit, or weather or road conditions at, near, or en route the location of the customer receiving the service.

In a further aspect of the present disclosure, the service transaction includes transporting or delivering a good or product.

In yet a further aspect of the present disclosure, the instructions, when executed by the processor(s), further cause the system to determine one or more paths for each of the vehicles of the fleet based on geographical data.

In yet another aspect of the present disclosure, determining one or more paths for the selected vehicle includes determining an optimal path for the selected vehicle based on the parameters for the service and geographical data.

In a further aspect of the present disclosure, the instructions, when executed by the processor(s), further cause the system to monitor the selected vehicle performing the service.

In an aspect of the present disclosure, the scheduling information includes repeat deliveries.

In another aspect of the present disclosure, the instructions, when executed by the processor(s), further cause the system to: receive a message that the selected vehicle has completed performing the requested service, and identify the selected vehicle as being available for performing another requested service.

In a further aspect of the present disclosure, the instructions, when executed by the processor(s), further cause the system to transmit information regarding the request for the service to a service provider.

In yet a further aspect of the present disclosure, the instructions, when executed by the processor(s), further cause the system to determine requests for services from multiple customers located near each other, and determine a path to deliver the services to the multiple customers using the selected vehicle.

Further details and aspects of exemplary embodiments of the present disclosure are described in more detail below with reference to the appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1:
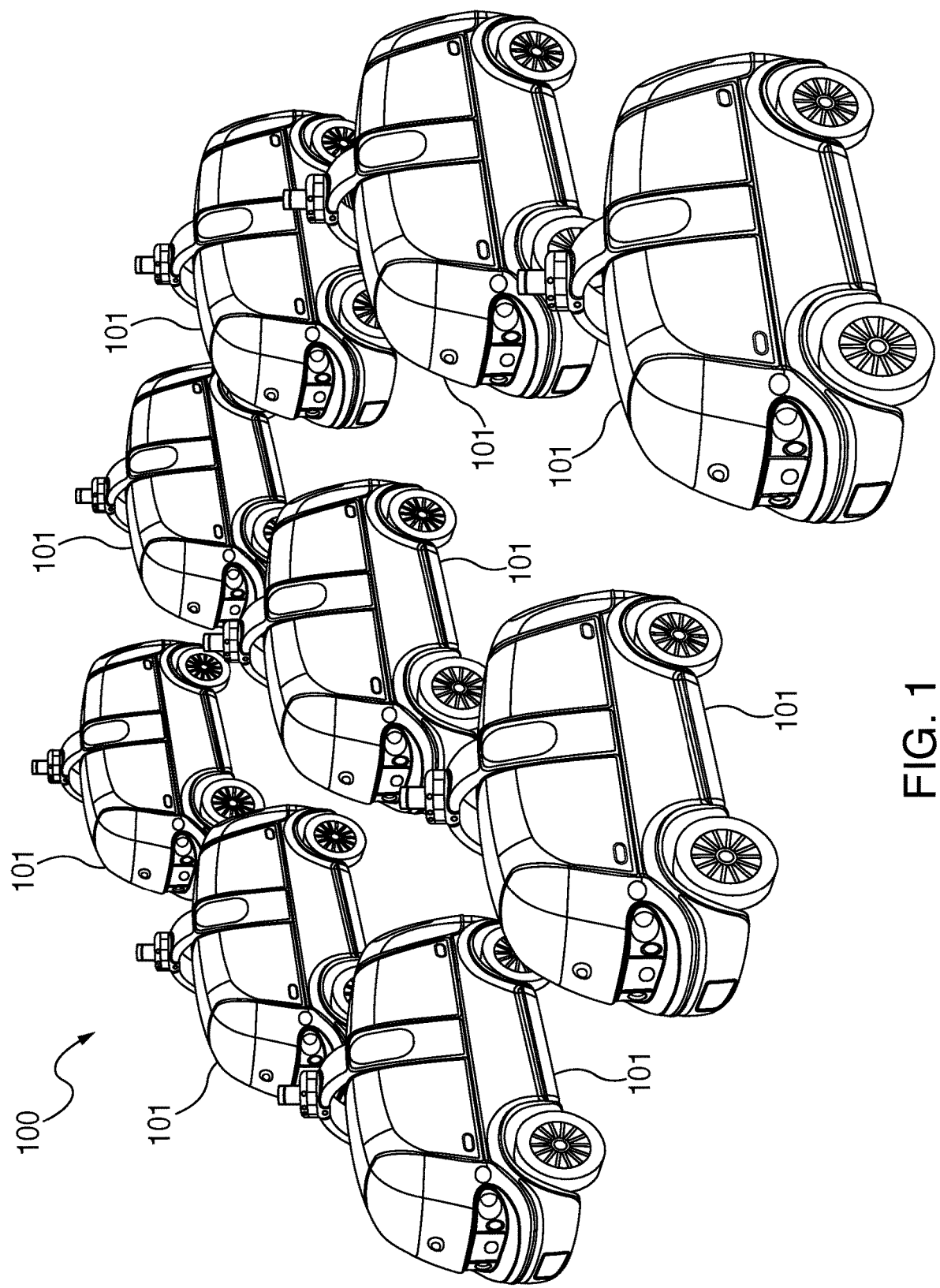
FIG. 1 is an exemplary view of an autonomous robot fleet, wherein each vehicle within a fleet or sub-fleet can be branded for an entity.

This disclosure relates to a fully-autonomous and/or semi-autonomous robot fleet and, in particular, to a fleet of mixed robot vehicles for transporting goods and/or making deliveries.

Provided herein is a mixed robot fleet having robot vehicles operating fully-autonomously, semi-autonomously, with a local human driver, and/or with a remote human driver, and a fleet management module for coordination of the mixed robot fleet, where each robot within the fleet is configured for retrieving, transporting, or delivering goods or services and is capable of operating in an unstructured open or closed environment. Each robot can include a power system, a conveyance system, a navigation module, at least one securable compartment or multiple securable compartments to hold goods, a controller configurable to associate each of the securable compartments to an assignable customer a customer group within a marketplace, or provider and provide entry when authorized, a communication module and a processor configured to manage the conveyance system, the navigation module, the sensor system, the communication module, and the controller.

As used herein, the term "autonomous" includes fully-autonomous, semi-autonomous, and any configuration in which a vehicle can travel in a controlled manner for a period of time without human intervention.

As used herein, the term "fleet," "sub-fleet," and like terms are used to indicate a number of land vehicles, watercraft, or aircraft operating together or under the same ownership. In some embodiments, the fleet or sub-fleet is engaged in the same activity. In some embodiments, the fleet or sub-fleet are engaged in similar activities. In some embodiments, the fleet or sub-fleet are engaged in different activities.

As used herein, the term "robot," "robot vehicle," "robot fleet," "vehicle," "all-terrain vehicle," and like terms are used to indicate a mobile machine that transports cargo, items, and/or goods. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land, and water types), unmanned aircraft, and even including unmanned spacecraft.

As used herein, the term "user," "operator," "fleet operator," and like terms are used to indicate the entity that owns or is responsible for managing and operating the robot fleet.

As used herein, the term "customer" and like terms are used to indicate the entity that requests the services provided by the robot fleet.

As used herein, the term "provider," "business," "vendor," "third party vendor," and like terms are used to indicate an entity that works in concert with the fleet owner or operator to utilize the services of the robot fleet to deliver the provider's product and/or return the provider's product to the provider's place of business or staging location.

As used herein, the term "server," "computer server," "central server," "main server," and like terms are used to indicate a computer or device on a network that manages the fleet resources, including the different types of vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for managing access to components of the robot such as the securable compartments.

As used herein a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task. As used herein the fleet management module includes software modules for managing various aspects and functions of the robot fleet.

As used herein, the term "processor," "digital processing device" and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory includes flash memory. In some embodiments, the non-volatile memory includes dynamic random-access memory (DRAM). In some embodiments, the non-volatile memory includes ferroelectric random access memory (FRAM). In some embodiments, the non-volatile memory includes phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

This disclosure relates to a fleet of vehicles for a transportation or delivery service that is comprised of any set of fully human-driven vehicles, semi-autonomous vehicles, fully-autonomous vehicles, vehicles operated remotely by human drivers, and any vehicle that is a combination/hybrid of these. The system can choose to dispatch an appropriate type of vehicle based on the specific requirements of that particular transaction. This can be based on distance, locations, customers' preferences, weather conditions, etc. The system may include a portal for a business to call, schedule, and monitor a delivery, and also a routing mechanism to find best paths for all the vehicles on the system.

The Fleet of Robot Vehicles

Provided herein is a robot fleet 100, as illustrated in FIG. 1, having robot vehicles 101, with each one operating fully-autonomously or semi-autonomously.

As illustrated in FIGS. 3-6, one exemplary configuration of a robot 101 is a vehicle configured for land travel, such as a small fully-autonomous (or semi-autonomous) automobile. The exemplary fully-autonomous (or semi-autonomous) automobile is narrow (e.g., 2-5 feet wide), low mass and low center of gravity for stability, having multiple secure compartments assignable to one or more customers, retailers and/or vendors, and designed for moderate working speed ranges (e.g., 1.0-45.0 mph) to accommodate inner city and residential driving speeds. Additionally, in some embodiments, the land vehicle robot units in the fleet are configured with a maximum speed range from 30.0 mph to about 90.0 mph for high speed, intrastate, or interstate driving. Each robot in the fleet is equipped with onboard sensors 170 (e.g., cameras (running at a high frame rate, akin to video), LiDAR, radar, ultrasonic sensors, microphones, etc.) and internal computer processing to constantly determine where it can safely navigate, what other objects are around each robot and what it may do.

In some embodiments, all or a portion of the robot fleet is fully-autonomous.

In some embodiments, all or a portion of the robot fleet is semi-autonomous. In some embodiments, it may be necessary to have human interaction between the robot 101, the fleet operator 200, the provider 204, and/or the customer 202 to address previously unforeseen issues (e.g., a malfunction with the navigation module; provider inventory issues; unanticipated traffic or road conditions; or direct customer interaction after the robot arrives at the customer location).

In some embodiments, the robot fleet 100 is controlled directly by the user 200. In some embodiments, it may be necessary to have direct human interaction between the robot 101 and/or the fleet operator 200 to address maintenance issues such as mechanical failure, electrical failure, or a traffic accident.

In some embodiments, the robot fleet is configured for land travel. In some embodiments, each robot land vehicle in the fleet is configured with a working speed range from 13.0 mph to 45.0 mph. In some embodiments, the land vehicle robot units in the fleet are configured with a maximum speed range from 30.0 mph to about 90.0 mph.

In some embodiments, the robot fleet is configured for water travel as a watercraft and is configured with a working speed range from 1.0 mph to 45.0 mph.

In some embodiments, the robot fleet is configured for hover travel as an over-land or over-water hovercraft and is configured with a working speed range from 1.0 mph to 60.0 mph.

In some embodiments, the robot fleet is configured for air travel as an aerial drone or aerial hovercraft and is configured with a working speed range from 1.0 mph to 80.0 mph.

In some embodiments of the robot fleet, the autonomous robots within the fleet are operated on behalf of third party vendor/service provider.

For example, a fleet management service is established to provide a roving delivery service for a third party beverage/food provider (e.g., a coffee service/experience for a third party vendor (i.e., Starbucks)). It is conceived that the fleet management service would provide a sub-fleet of "white label" vehicles carrying the logo and products of that third party beverage/food provider to operate either fully-autonomously or semi-autonomously to provide this service.

In some embodiments of the robot fleet, the autonomous robots within the fleet are further configured to be part of a sub-fleet of autonomous robots, and each sub-fleet is configured to operate independently or in tandem with multiple sub-fleets having two or more sub-fleets (100-*a*, 100-*b*).

For example, a package delivery service is configured to offer multiple levels of service such as "immediate dedicated rush service," "guaranteed morning/afternoon delivery service," or "general delivery service." A service provider could then have a dedicated sub-fleet of delivery vehicles for each type of service within their overall fleet of vehicles. In yet another example, a third party has priority over a certain number of vehicles in the fleet. In so doing, they can guarantee a certain level of responsiveness. When they are not using the vehicles, the vehicles are used for general services within the fleet (e.g., other third parties).

In some embodiments, the robot fleet is controlled directly by the user.

In some embodiments, there will likely be times when a vehicle breaks down, has an internal system or module failure or is in need of maintenance. For example, in the event that the navigation module should fail, each robot within the fleet is configurable to allow for direct control of the robot's processor to override the conveyance and sensor systems (i.e., cameras, etc.) by a fleet operator to allow for the safe return of the vehicle to a base station for repair.

The Operating Environments

In some embodiments, the unstructured open environment is a non-confined geographic region accessible by navigable pathways, including, for example, public roads, private roads, bike paths, open fields, open public lands, open private lands, pedestrian walkways, lakes, rivers or streams.

In some embodiments, the closed environment is a confined, enclosed or semi-enclosed structure accessible by navigable pathways, including, for example, open areas or rooms within commercial architecture, with or without structures or obstacles therein, airspace within open areas or rooms within commercial architecture, with or without structures or obstacles therein, public or dedicated aisles, hallways, tunnels, ramps, elevators, conveyors, or pedestrian walkways.

In some embodiments, the unstructured open environment is a non-confined airspace or even near-space environment which includes all main layers of the Earth's atmosphere including the troposphere, the stratosphere, the mesosphere, the thermosphere and the exosphere.

In some embodiments, the navigation module controls routing of the conveyance system of the robots in the fleet in the unstructured open or closed environments.

The Fleet Management Module

In some embodiments, the robot fleet 100 includes a fleet management module 120, which is associated with a main or central server 110, for coordination of the robot fleet 100 and assignment of tasks for each robot 101 in the fleet. The fleet management module 120 coordinates the activity and positioning of each robot in the fleet. In addition to communicating with the robot fleet, fleet owner/operator, and/or user, the fleet management module 120 also communicates with customers and providers, vendors, or businesses to optimize behavior of the entire system.

The fleet management module 120 works in coordination with a central server 110, which is typically located in a central operating facility owned or managed by the fleet owner 200. In embodiments, the fleet management module 120 may be implemented by software, which may be executed by the central server 110 or by a separate server or suitable computer system.

Figure 11:
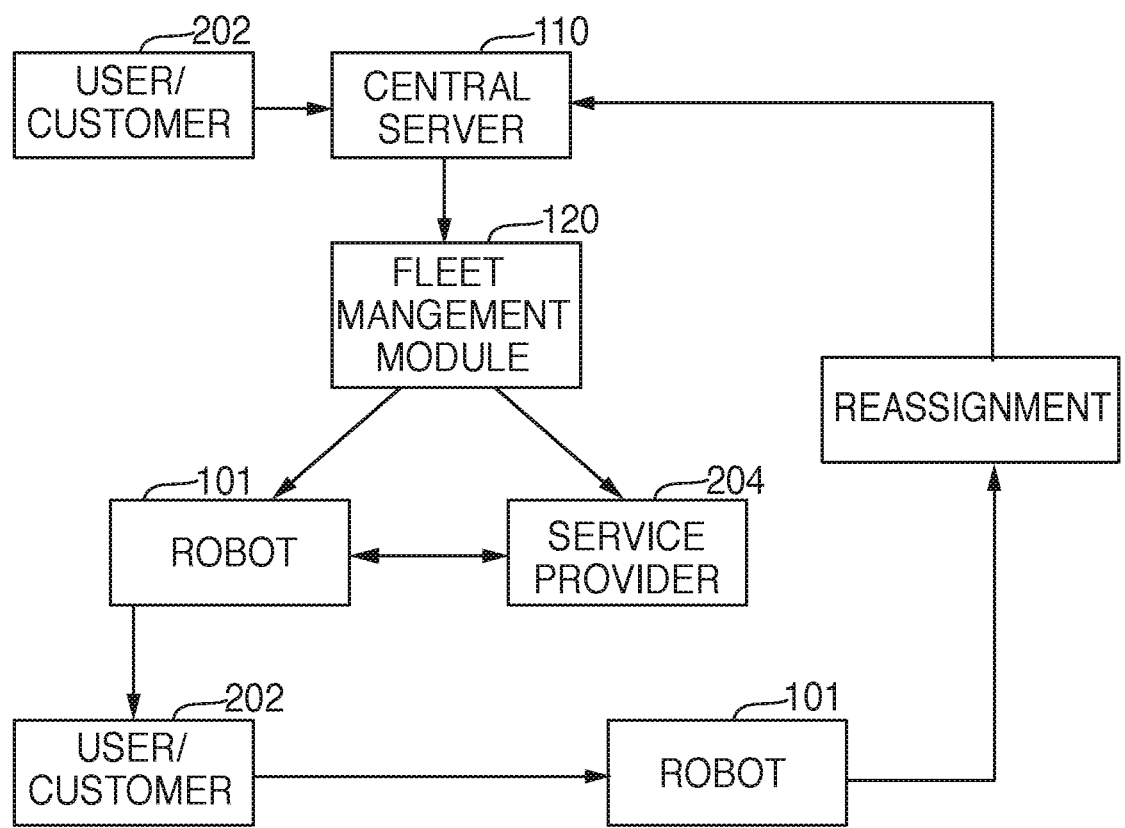
FIG. 11 is an exemplary flowchart representation of the logic for a fleet management control module associated with a central server for the robot fleet.

As illustrated in FIG. 11, in embodiments, a request is sent by a user or customer 202 to the central server 110 (which may be located at the fleet owner's or fleet manager's location), which then communicates with the fleet management module 120 regarding the request. The fleet management module 120 then relays the request to the appropriate service provider 204 (e.g., restaurant, delivery service, vendor, or retailer) and an appropriate robot or robots 101 in the fleet. The best appropriate robot or robots in the fleet within the geographic region and typically closest to the service provider 204, is then assigned the task, and the service provider 204 then interacts with that robot 101 at their business (e.g., loading it with goods, if needed). The robot 101 then travels to the user or customer 202 and the user or customer 202 interacts with the robot 101 to retrieve their goods or service (e.g., requested or ordered goods). An interaction can include requesting the robot 101 to open its compartment 102, 104 through the customer's mobile application or through a user interface on the robot 202 itself (using, e.g., an RFID reader and the customer's phone, a touchpad, a keypad, voice commands, vision-based recognition of the person, etc.). Upon completion of the delivery (or retrieval, if appropriate), the robot 101 reports completion of the assignment and reports back to the fleet management module 120 for another assignment.

Figure 12:
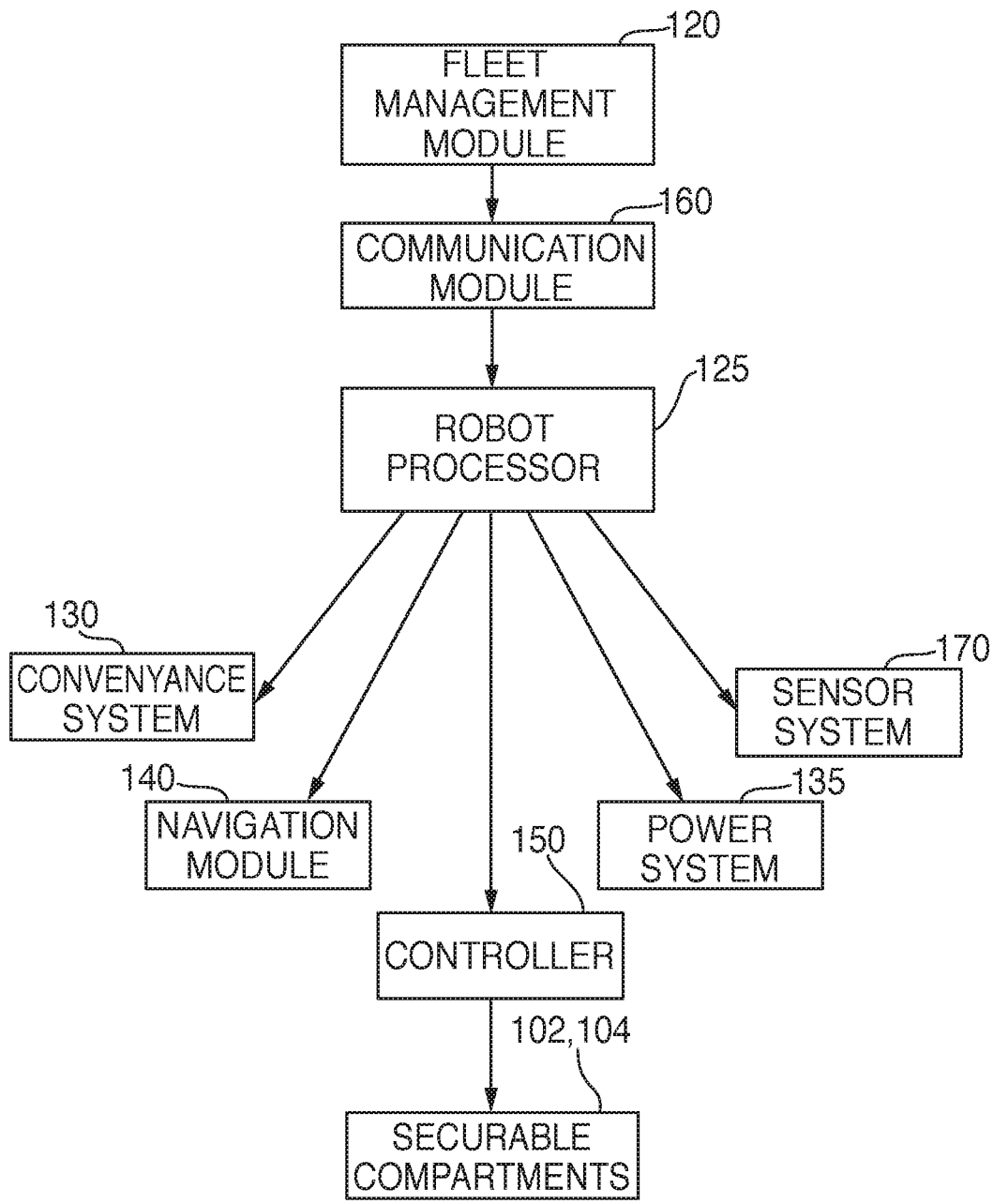
FIG. 12 is an exemplary flowchart representation of the logic flow from the Fleet Management Control Module through the robot processor to the various systems and modules of the robot.

As further illustrated in FIG. 12, and as previously noted, in some embodiments, the fleet management module 120 handles coordination of the robot fleet 100 and assignment of tasks for each robot 101 in the fleet. The fleet management module 120 coordinates the activity and positioning of each robot 101 in the fleet. The fleet management module 120 also communicates with service providers 204 (e.g., vendors or businesses) and customers 202 to optimize behavior of the entire system. It does this by utilizing the robot's processor 125 to process the various inputs and outputs from each of the robot's systems and modules, including: the conveyance system 130, the power system 135, the navigation module 140, the sensor system 170, 175, the communication module 160, and the controller 150, to effectively manage and coordinate the various functions of each robot 101 in the fleet.

In some embodiments, the robot 101 may be requested for a pick-up of an item (e.g., a document) with the intent of delivering the item to another party. In this scenario, the fleet management module 120 would assign the robot 101 to arrive at a given location, assign a securable compartment for receipt of the item, confirm receipt from the first party to the fleet management module 120, then proceed to the second location where an informed receiving party would recover the item from the robot 101 using an appropriate PIN or other recognition code to gain access to the secure compartment. The robot would then report completion of the assignment and report back to the fleet management module 120 for another assignment.

Figure 13:
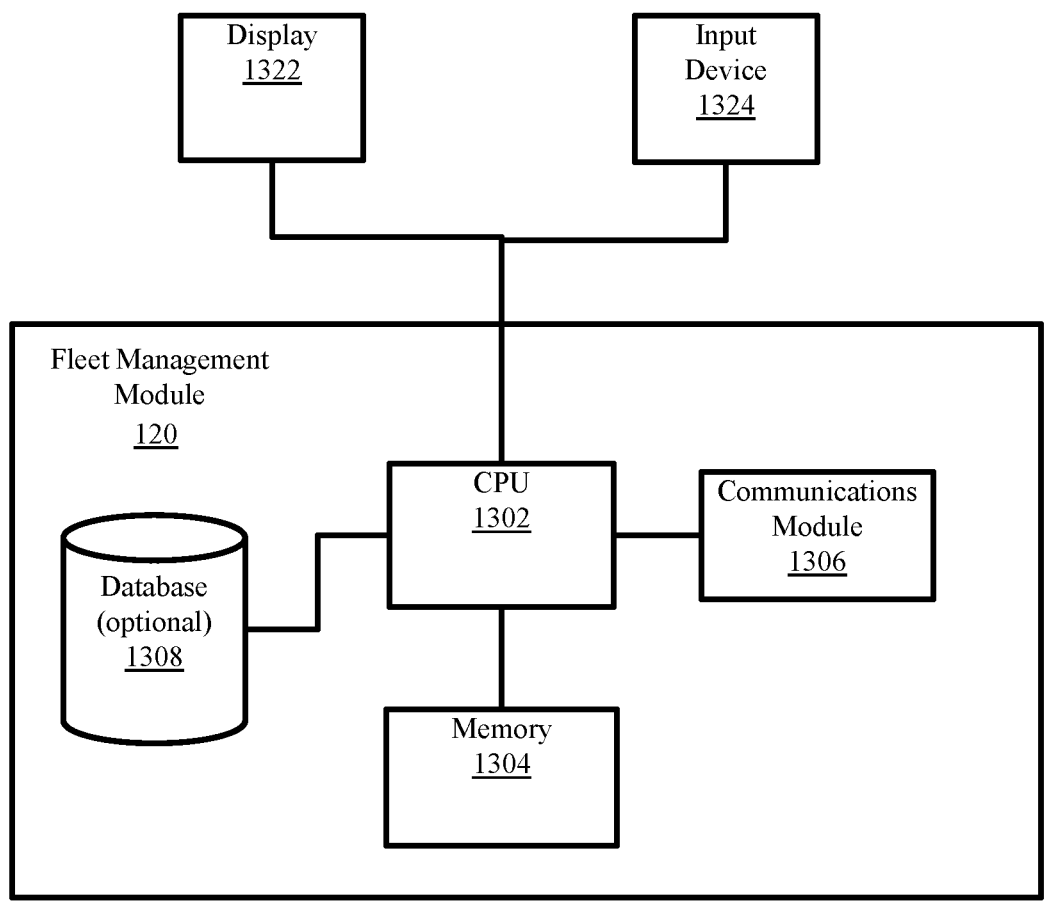
FIG. 13 is an exemplary block diagram of the fleet management control module of FIGS. 12.

As illustrated in FIG. 13, the fleet management module 120 may include a central processing unit (CPU) 1302, a memory 1304, a communications module 1306, and a database 1308. The memory 1304 may store instructions for carrying out fleet management functions according to this disclosure. Those instructions may be retrieved by the CPU 1302 from the memory 1304 and executed by the CPU 1302. In embodiments, the fleet management module 120 may also include a database 1308, which may store, among other things, information regarding each robot 101 in the fleet and map information. The map information may be used by the fleet management module 120 to determine routes for the robots 101 to carry out a requested delivery or pickup.

The fleet management module 120 also includes a communications module 1306 for communicating with each of the robots 101. For example, the fleet management module 120 may communicate with the robots 101 via the communications module 1306 to obtain information regarding their position, their progress on a delivery or pickup task, their health (e.g., energy level or tire pressure), their speed, or the environment at their current or past locations (e.g., road or weather conditions). The fleet management module 120 may also receive requests or orders from customers, communicate with service providers 204, and issue commands to the robots 101 to fulfill the requests or orders from the customers in a manner consistent with parameters or rules that may be set by the service provider 204 (e.g., the maximum time of deliver to each customer 202, the type of vehicle used for the delivery, or a temperature range for the goods).

The fleet management module 120 may be electrically coupled to a display 1322 and an input device 1324 to allow the fleet owner or manager to operate or monitor the fleet management module 120. For example, the fleet manager may set or alter various parameters of the software stored in memory 1304 to thereby alter the functions performed by the fleet management module 120.

Figure 14:
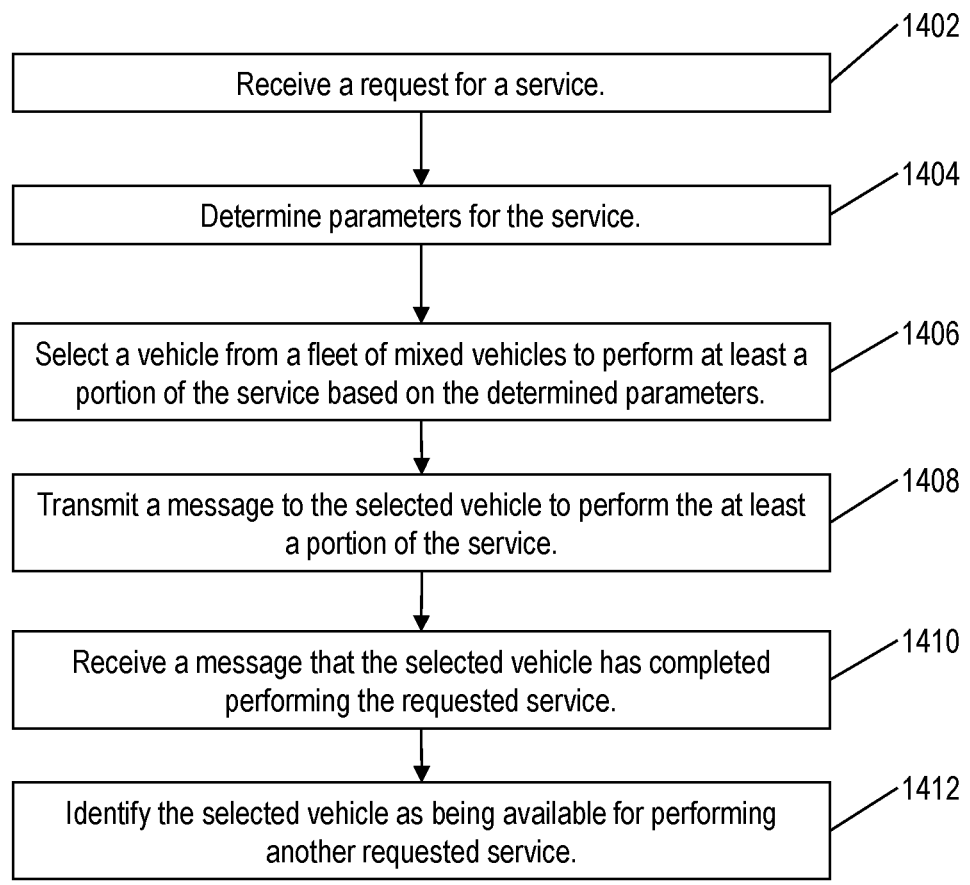
FIG. 14 is an exemplary flowchart of a method of managing the reception, transportation, and/or delivery of goods using a mixed fleet of vehicles.

FIG. 14 is an exemplary flowchart of a method of managing the transportation and delivery of goods using the fleet management module 120. In block 1402, the fleet management module 120 receives a request for a service either directly from the customer 202 or from the customer 202 via the central server 110. In various embodiments, the customer is a consumer. In various embodiments, the customer is a provider that provides goods or services to consumers. In various embodiments, the service can include transportation and/or delivery of items or goods.

In block 1404, the parameters for the service are determined. In various embodiments, the parameters may include the customer's 202 preference for service providers, the type of vehicle needed to perform the delivery, care instructions for the one or more goods, and/or size and weight of the one or more goods, among other parameters. In various embodiments, the parameters can include one or more of distance, location, customer's preference, vehicle type, size of a requested good, weight of a requested good, time, service-level agreement, optimal delivery route, speed limit, and/or weather or road conditions at, near, or en route the location of the customer receiving the service.

In block 1406, a vehicle is selected from a fleet of mixed vehicles based on the determined parameters, to perform at least a portion of the service. In various embodiments, the mixed fleet includes combinations of fully-autonomous vehicles, semi-autonomous vehicles, vehicles driven by a local human driver, and vehicles driven by a remote human driver, such as combinations of two or more such vehicle types. In various embodiments, these parameters may be related to the order details (e.g., what the customer requires), the capabilities of the vehicles in the fleet (e.g., what types of conditions the vehicles can handle), and additional considerations by the system (e.g., some vehicles in fleet may be more cost-effective to operate). For example, if the weather is very poor, the system may decide that it is suboptimal for an autonomous robot vehicle to operate in the environment, so the system may dispatch a vehicle driven by a human driver or a vehicle driven by a remote human driver. In another example, if the item that the customer ordered does not fit into an autonomous robot vehicle compartment, the system may need to dispatch a vehicle driven by a human driver. In yet another example, a customer, based on preferences or due to differences in price, may specifically request a fully-autonomous vehicle. In a further example, if the system is making a delivery near a busy area, the system may decide that using vehicles driven by a remote human driver or using semi-autonomous vehicles are safer or easier than fully autonomy vehicles for that situation. In yet a further example, the system may decide that it may not have the capabilities yet to operate on certain roads/areas and therefore may deploy a remotely-operated vehicle or human-driven vehicle. In another example, a portion of the route that the vehicle needs to traverse to travel to the customer may be driven autonomously while other parts may need to be driven with more human supervision (due to speed limit or road conditions), and thus, the system may select a semi-autonomous vehicle. In yet another example, the delivery destination may be a relatively new area that the system may not have operated in before, and the system can decide to send semi-autonomous vehicles into the area before introducing fully autonomous vehicles later.

In block 1408, the system transmits a message to the selected vehicle to perform a portion of the service or all of the service. In various embodiments, the service includes transporting or delivering a good or product. In various embodiments, the system can determine one or more paths for the selected vehicle, and the message transmitted to the vehicle can include information on the one or more paths. In various embodiments, the system can determine requests for services from multiple customers located near each other, and can determine a path to deliver the services to the multiple customers using the selected vehicle. In various embodiments, the system can optionally monitor the selected vehicle performing the service.

In block 1410, the system receives a message that the selected vehicle has completed the requested service. And in block 1412, the system identifies the selected vehicle as being available to perform another requested service.

The operation of FIG. 14 is exemplary, and variations are contemplated to be within the scope of the present disclosure. For example, in various embodiments, where the customer is a consumer, the system can transmit the request for service to a service provider. Other variations are contemplated.

Conveyance Systems

Each robot vehicle 101 in the fleet includes a conveyance system 130 (e.g., a drive system with a propulsion engine, wheels, treads, wings, rotors, blowers, rockets, propellers, brakes, etc.).

As noted previously, the robot fleet is configurable for land, water or air. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land, and water types), unmanned aircraft, and unmanned spacecraft.

In one exemplary embodiment, a robot land vehicle 101 is configured with a traditional 4-wheeled automotive configuration comprising conventional steering and braking systems. The drive train is configurable for standard 2-wheel drive or 4-wheel all-terrain traction drive. The propulsion system (engine) is configurable as a gas engine, a turbine engine, an electric motor and/or a hybrid gas/electric engine. Alternatively, the robot could be configured with an auxiliary solar power system 135 to provide back-up emergency power or power for minor low-power sub-systems.

Alternative configurations of components to a total drive system with a propulsion engine could include wheels, treads, wings, rotors, blowers, rockets, propellers, brakes, etc.

In some embodiments, the robot fleet is configured for water travel as a watercraft with a propulsion system (engine) that is configurable as a gas engine, a turbine engine, an electric motor and/or a hybrid gas/electric engine and is further configured with a propeller.

In some embodiments, the robot fleet is configured for hover travel as an over-land or over-water hovercraft or an air-cushion vehicle (ACV) and is configured with blowers to produce a large volume of air below the hull that is slightly above atmospheric pressure. The propulsion system (engine) is configurable as a gas engine, a turbine engine, an electric motor and/or a hybrid gas/electric engine.

In some embodiments, the robot fleet is configured for air travel as an aerial drone or aerial hovercraft and is configured with wings, rotors, blowers, rockets, and/or propellers and an appropriate brake system. The propulsion system (engine) is configurable as a gas engine, a turbine engine, an electric motor and/or a hybrid gas/electric engine.

The Power System

In some embodiments, each robot of the robot fleet is configured with one or more power sources, which include the power system 135 (e.g., battery, solar, gasoline, propane, etc.).

Navigation Module

Each robot in the fleet further includes a navigation module 140 for navigation in the unstructured open or closed environments (e.g., digital maps, HD maps, GPS, etc.). In some embodiments, the robot fleet 100 relies on maps generated by the user, operator, or fleet operator, specifically created to cover the intended environment where the robot is configured to operate. These maps would then be used for general guidance of each robot in the fleet, which would augment this understanding of the environment by using a variety of on-board sensors such as cameras, LiDAR, altimeters or radar to confirm its relative geographic position and elevation.

In some embodiments, for navigation, the fleet of robots uses internal maps to provide information about where they are going and the structure of the road environment (e.g., lanes, etc.) and combine this information with onboard sensors (e.g., cameras, LiDAR, radar, ultrasound, microphones, etc.) and internal computer processing to constantly determine where they can safely navigate, what other objects are around each robot and what they may do. In still other embodiments, the fleet incorporates on-line maps to augment internal maps. This information is then combined to determine a safe, robust trajectory for the robot to follow and this is then executed by the low level actuators on the robot.

In some embodiments, the fleet relies on a global positioning system (GPS) that allows land, sea, and airborne users to determine their exact location, velocity, and time 24 hours a day, in all weather conditions, anywhere in the world.

In some embodiments, the fleet of robots will use a combination of internal maps, sensors and GPS systems to confirm its relative geographic position and elevation.

In some embodiments, the autonomous fleet is strategically positioned throughout a geographic region in anticipation of a known demand.

Over time, a user 200 and/or a vendor 204 can anticipate demand for robot services by storing data concerning how many orders (and what type of orders) are made at particular times of day from different areas of the region. This can be done for both source (e.g., restaurants, grocery stores, general businesses, etc.) and destination (e.g., customer, other businesses, etc.). Then, for a specific current day and time, this stored data is used to determine what the optimal location of the fleet is given the expected demand. More concretely, the fleet can be positioned to be as close as possible to the expected source locations, anticipating these source locations will be the most likely new orders to come into the system. Even more concretely, it is possible to estimate the number of orders from each possible source in the next hour and weight each source location by this number. Then one can position the fleet so that the fleet optimally covers the weighted locations based on these numbers.

In some embodiments of the robot fleet, the positioning of robots can be customized based on: anticipated use, a pattern of historical behaviors, or specific goods being carried.

Sensor Systems

As noted previously, each robot is equipped with a sensor system 170, which includes at least a minimum number of onboard sensors (e.g., cameras (for example, those running at a high frame rate akin to video), LiDAR, radar, ultrasonic sensors, microphones, etc.) and internal computer processing 125 to constantly determine where it can safely navigate, what other objects are around each robot, and what it may do within its immediate surroundings.

In some embodiments, the robot vehicles of the robot fleet further include conveyance system sensors 175 configured to: monitor drive mechanism performance (e.g., the propulsion engine); monitor power system levels 135 (e.g., battery, solar, gasoline, propane, etc.); or monitor drive train performance (e.g., transmission, tires, brakes, rotors, etc.).

Communications Module

Each robot in the fleet further includes a communication module 160 configurable to receive, store and send data to the fleet management module 120, to a user, to and from the fleet management module 120, and to and from the robots in the fleet 100. In some embodiments, the data is related to at least user interactions and the robot fleet interactions, including, for example, scheduled requests or orders, on-demand requests or orders, or a need for self-positioning of the robot fleet based on anticipated demand within the unstructured open or closed environments.

In some embodiments, each robot vehicle in the fleet includes at least one communication module configurable to receive, store and transmit data, and to store that data to a memory device, for future data transfer or manual download.

In some embodiments, each business 204 and customer 202 has their own app/interface to communicate with the fleet operator 200 (e.g., "Nuro customer app" for customers on their phone, "Nuro vendor app" for businesses on a tablet or phone or their internal computer system, etc.).

In some embodiments, the communication to the user and the robots in the fleet, between the robots of the fleet, and between the user and the robots in the fleet, occurs via wireless transmission.

In some embodiments, the user's wireless transmission interactions and the robot fleet wireless transmission interactions occur via mobile application transmitted by an electronic device and forwarded to the communication module via: a central server, a fleet management module 120, and/or a mesh network.

In some embodiments, one preferred method of communication is to use cellular communication between the fleet manager and fleet of robots, (e.g., 3G, 4G, 5G, or the like). Alternatively, the communication between the fleet control module and the robots could occur via satellite communication systems.

In some embodiments, a customer uses an app (either on a cellphone, laptop, tablet, computer or any interactive device) to request a service (e.g., an on-demand food order or for a mobile marketplace robot to come to them).

In some embodiments, the electronic device includes: a phone, a personal mobile device, a personal digital assistant (PDA), a mainframe computer, a desktop computer, a laptop computer, a tablet computer, and/or wearable computing device such as a communication headset, smart glasses, a contact lens or lenses, a digital watch, a bracelet, a ring, jewelry, or a combination thereof.

Goods and Services

In some embodiments, the user includes a fleet manager, a sub-contracting vendor, a service provider, a customer, a business entity, an individual, or a third party.

In some embodiments, the services include: subscription services, prescription services, marketing services, advertising services, notification services, or requested, ordered or scheduled delivery services. In particular embodiments, the scheduled delivery services include, by way of example, special repeat deliveries such as groceries, prescriptions, drinks, mail, documents, etc.

In some embodiments, the services further include: the user receiving and returning the same or similar goods within the same interaction (e.g., signed documents), the user receiving one set of goods and returning a different set of goods within the same interaction, (e.g., product replacement/returns, groceries, merchandise, books, recording, videos, movies, payment transactions, etc.), a third party user providing instruction and or authorization to a goods or service provider to prepare, transport, deliver and/or retrieve goods to a principle user in a different location.

In some embodiments, the services further include: advertising services, land survey services, patrol services, monitoring services, traffic survey services, signage and signal survey services, architectural building or road infrastructure survey services.

In some embodiments, at least one robot is further configured to process or manufacture goods.

In some embodiments, the processed or manufactured goods include: beverages, with or without condiments (such as coffee, tea, carbonated drinks, etc.); various fast foods; or microwavable foods.

In some embodiments, the robots within the fleet are equipped for financial transactions. These can be accomplished using known transaction methods such as debit/credit card readers or the like.

Securable Compartments

Figure 2:
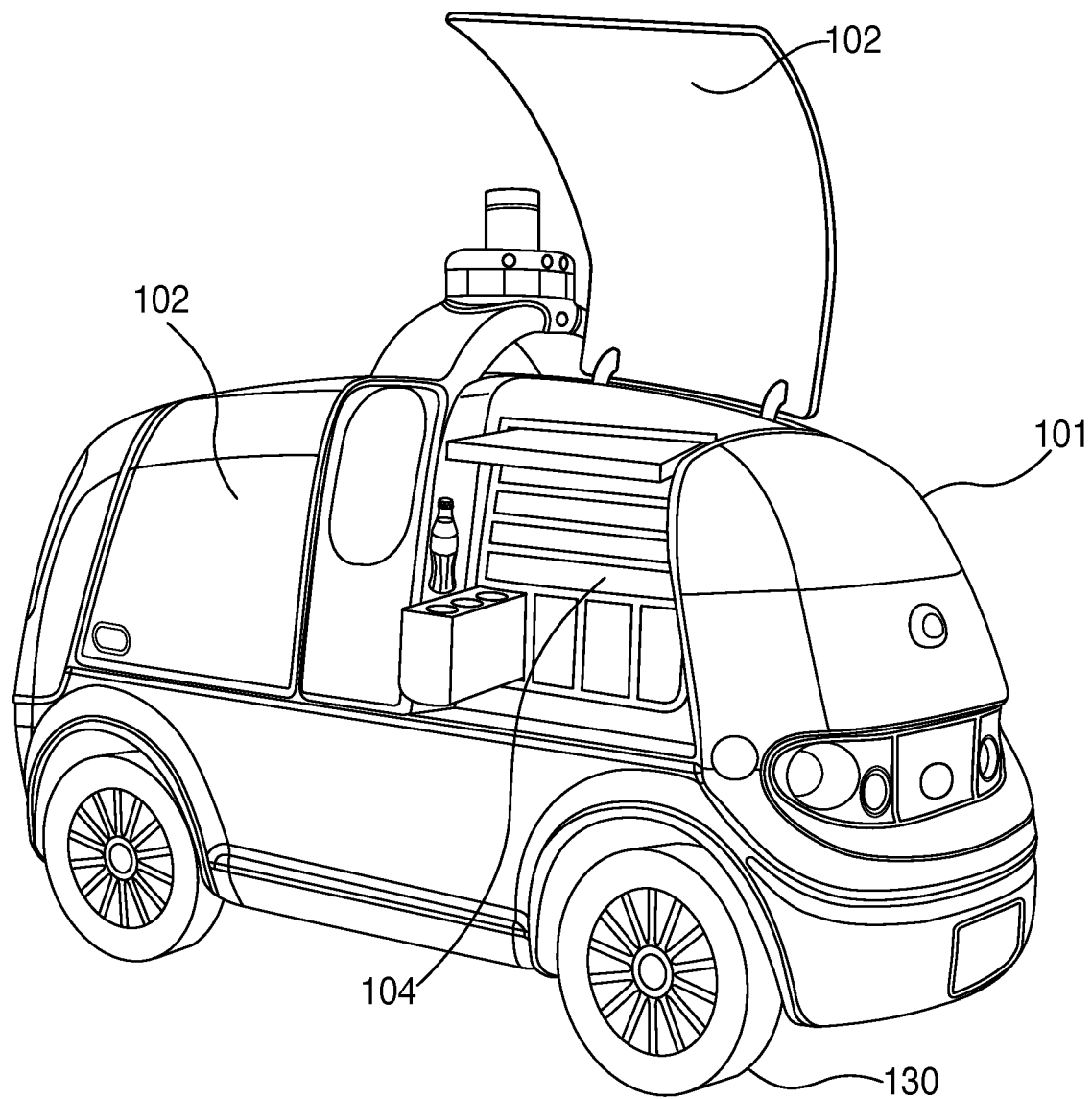
FIG. 2 is an exemplary ISO view of a robot vehicle, part of an autonomous robot fleet, illustrating securable compartments within the vehicle.
Figure 3:
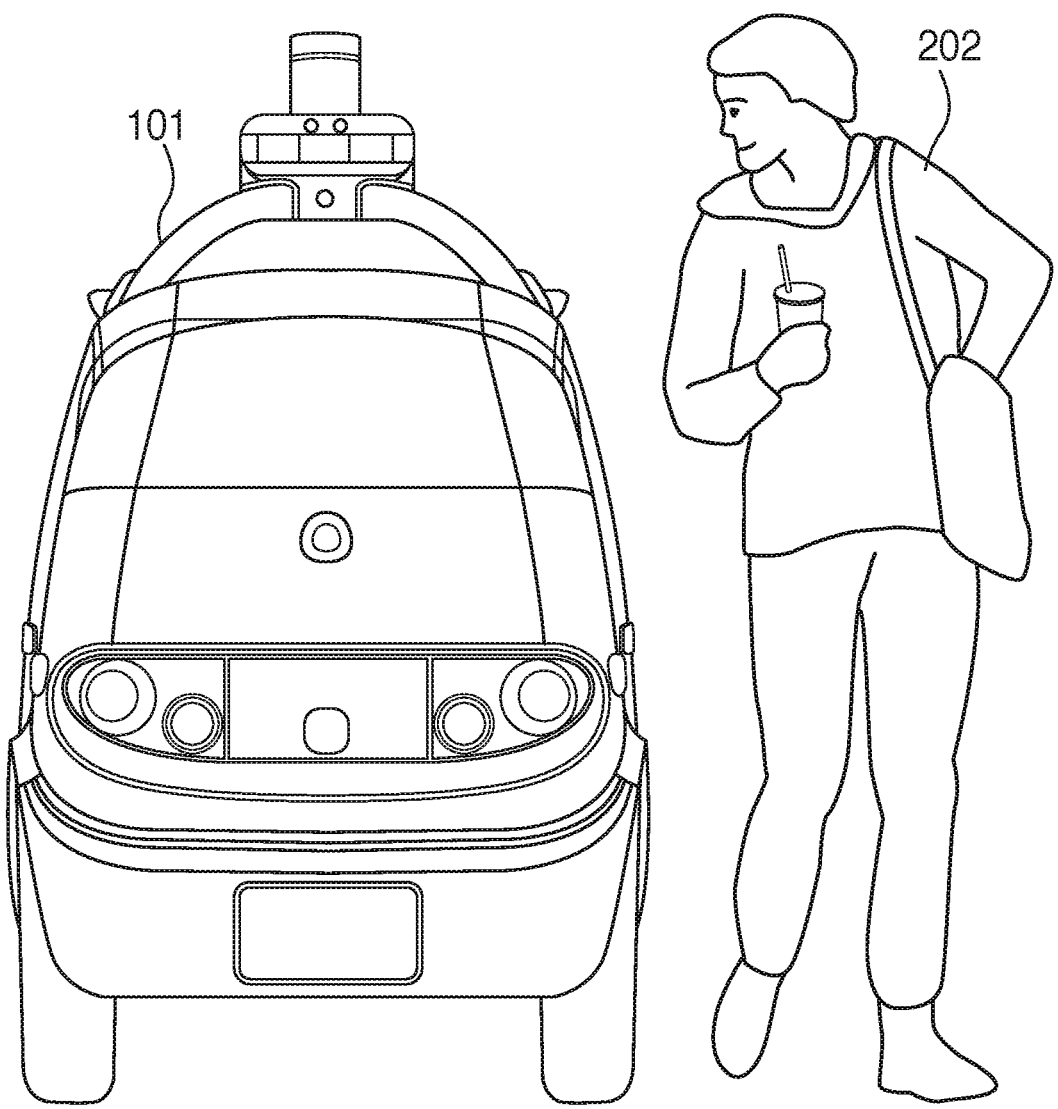
FIG. 3 is an exemplary front view of a robot vehicle, part of an autonomous robot fleet, shown in comparison to the height of an average person.
Figure 4:
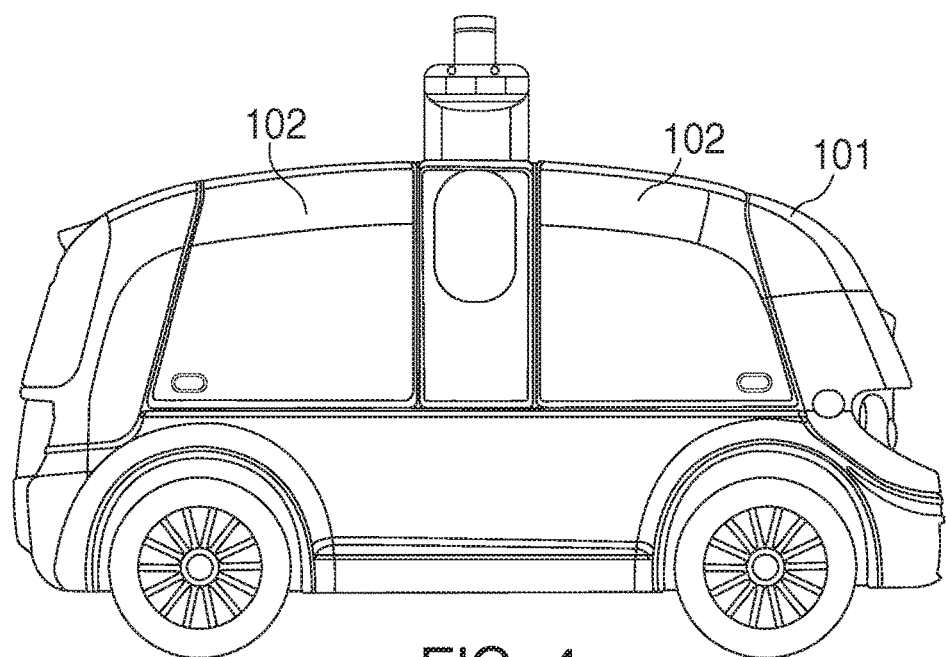
FIG. 4 is an exemplary right side view of a robot vehicle, part of an autonomous robot fleet, illustrating a configuration with two large side doors, each enclosing securable compartments.
Figure 5:
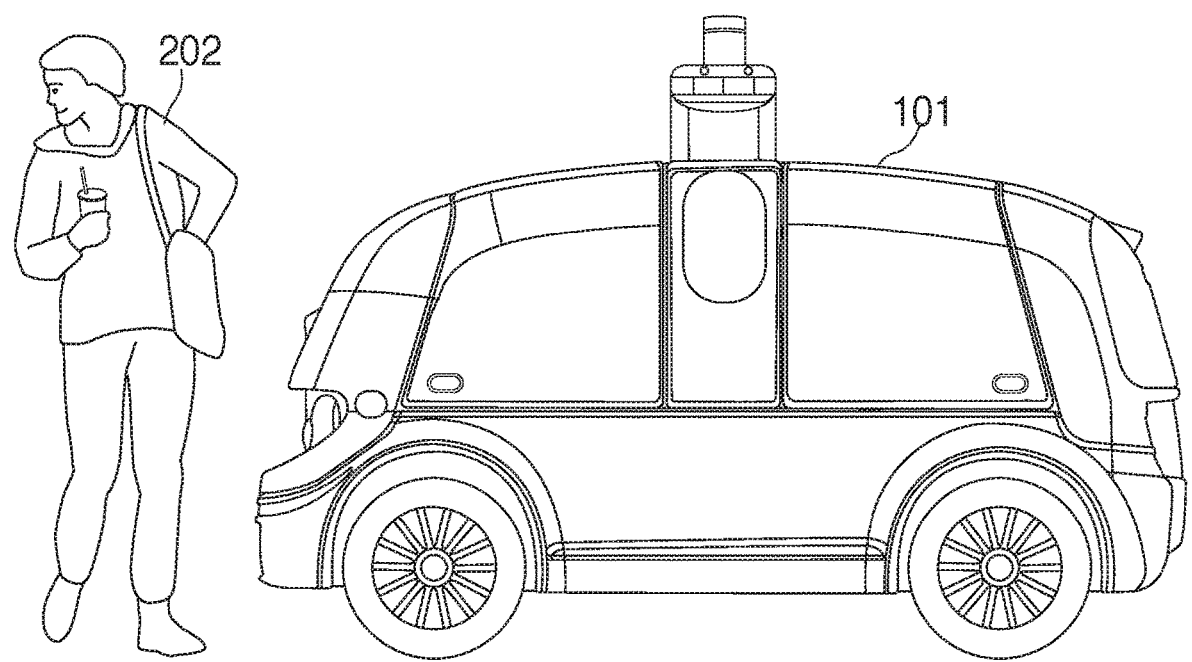
FIG. 5 is an exemplary left side view of a robot vehicle, part of an autonomous robot fleet, shown in comparison to the height of an average person.
Figure 6:
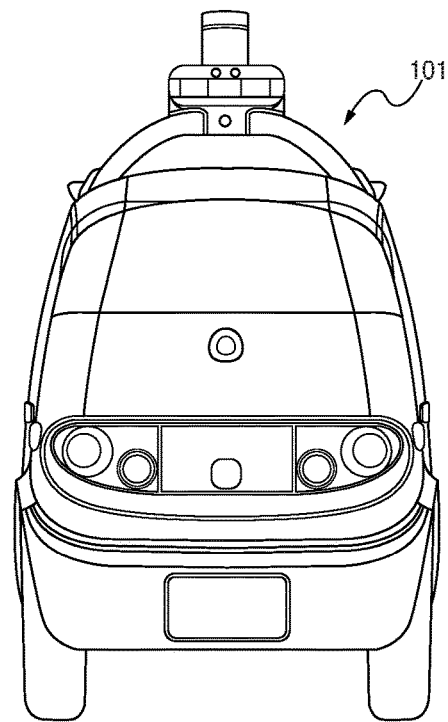
FIG. 6 is an exemplary rear view of a robot vehicle, part of an autonomous robot fleet.
Figure 7:
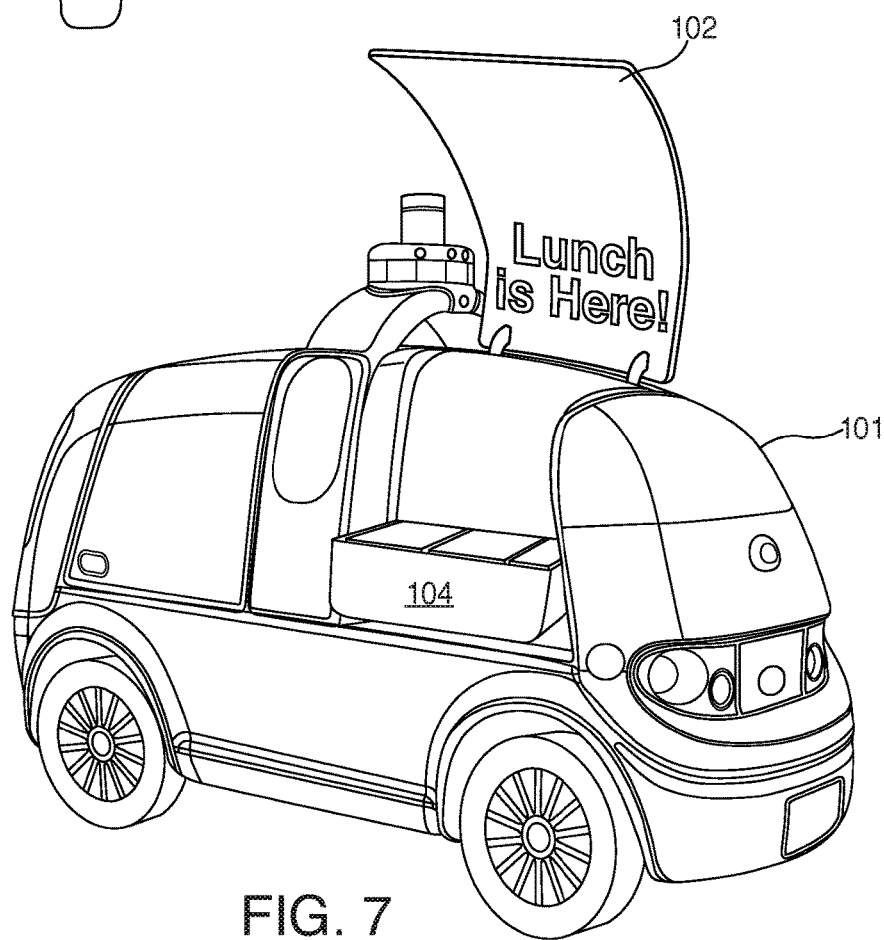
FIG. 7 is an exemplary ISO view of a robot vehicle, part of an autonomous robot fleet, illustrating an autonomous lunch delivery vehicle for any branded company.

As illustrated in FIG. 2, robots in the fleet are each configured for transporting, delivering or retrieving goods or services and are capable of operating in an unstructured open environment or closed environment. In some embodiments, the vehicle 101 is configured to travel practically anywhere that a small all-terrain vehicle could travel on land, while providing at least one and preferably two large storage compartments 102, and more preferably, at least one large compartment 102 is configured with smaller internal secure compartments 104 of variable configurations to carry individual items that are to be delivered to, or need to be retrieved from customers.

Alternately, in some embodiments, the vehicle could be configured for water travel, providing at least one and preferably two large storage compartments, and more preferably, at least one large compartment is configured with smaller internal secure compartments of variable configurations to carry individual items that are to be delivered to, or need to be retrieved from customers.

Further still, in some embodiments, the vehicle could be configured for hover travel, providing at least one and preferably two large storage compartments, and more preferably, at least one large compartment is configured with smaller internal secure compartments of variable configurations to carry individual items that are to be delivered to, or need to be retrieved from customers.

Further still, in some embodiments, the vehicle could be configured for aerial drone or aerial hover travel, providing at least one and preferably two large storage compartments, and more preferably, at least one large compartment is configured with smaller internal secure compartments of variable configurations to carry individual items that are to be delivered to, or need to be retrieved from customers.

Figure 8:
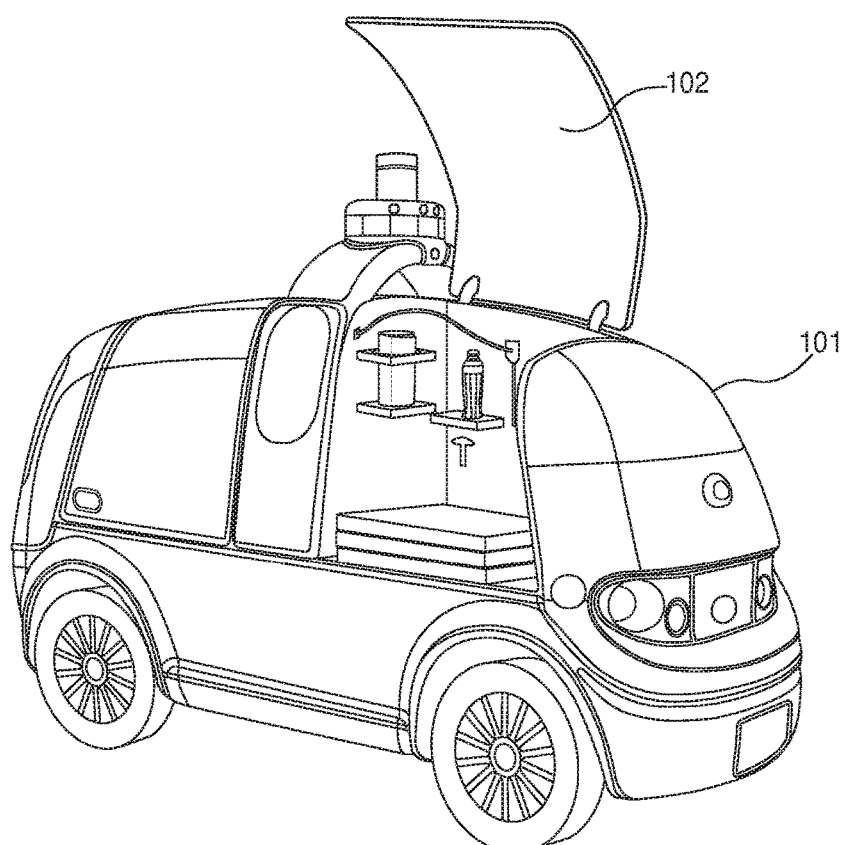
FIG. 8 is an exemplary ISO view of a robot vehicle, part of an autonomous robot fleet, illustrating an autonomous pizza delivery vehicle for any branded company.
Figure 9:
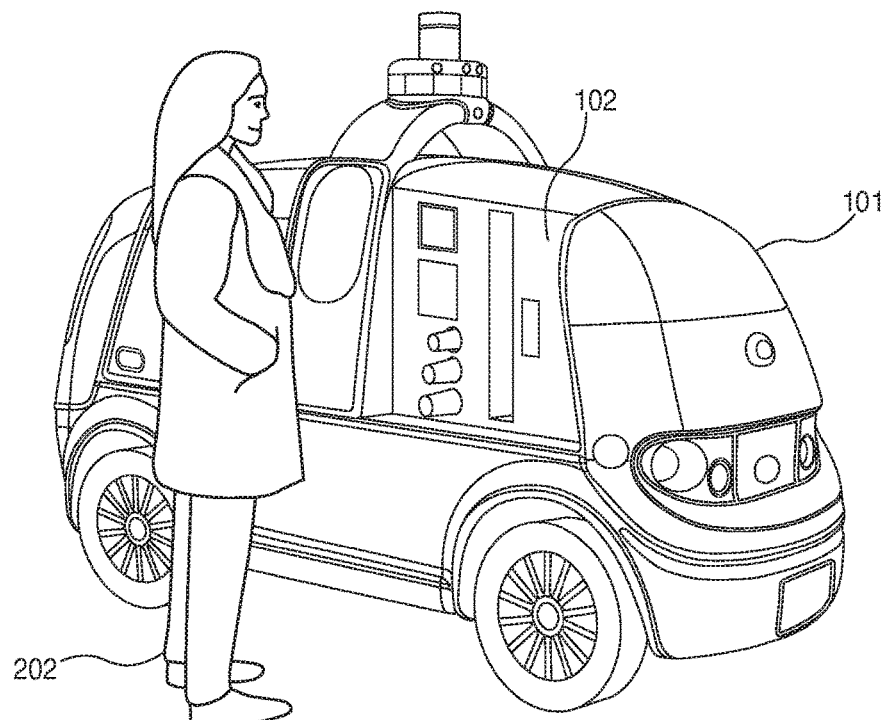
FIG. 9 is an exemplary ISO view of a robot vehicle, part of an autonomous robot fleet, illustrating an autonomous coffee delivery vehicle for any branded company.
Figure 10:
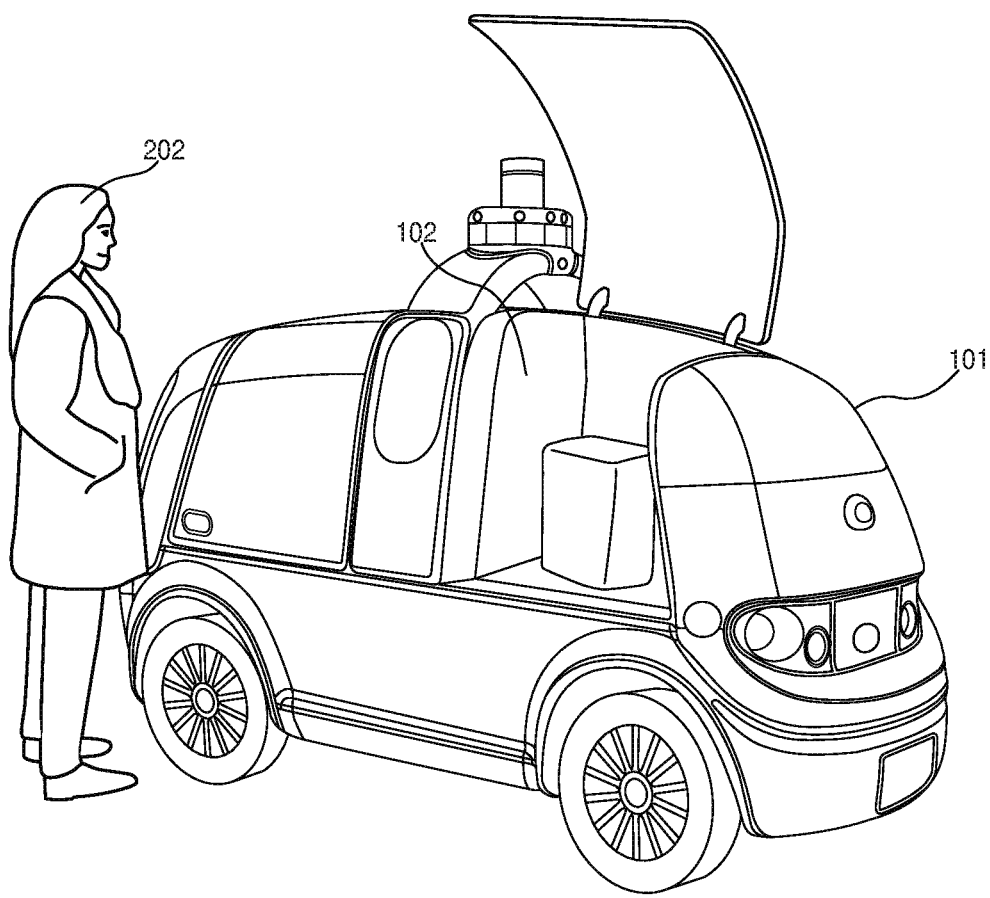
FIG. 10 is an exemplary ISO view of a robot vehicle, part of an autonomous robot fleet, illustrating an autonomous evening/nighttime delivery vehicle for any branded company, comprising a lighted interior.

As illustrated in FIGS. 7-10, in some embodiments, the securable compartments are humidity and temperature controlled for, for example, hot goods, cold goods, wet goods, dry goods, or combinations or variants thereof. Further still, as illustrated in FIGS. 8-10, the compartment(s) are configurable with various amenities, such as compartment lighting for night deliveries and condiment dispensers.

In some embodiments, the securable compartments are configurable for various goods. Such configurations and goods include: bookshelves for books, thin drawers for documents, larger box-like drawers for packages, and sized compartments for vending machines, coffee makers, pizza ovens, and dispensers.

In some embodiments, the securable compartments are variably configurable based on: anticipated demands, patterns of behaviors, area of service, or types of goods to be transported.

Further still, each robot includes securable compartments to hold said goods or items associated with said services, and a controller 150 configurable to associate each one of the securable compartments 102, 104 to an assignable customer 202 or provider 204 and provide entry when authorized. Each robot vehicle further includes at least one processor configured to manage the conveyance system, the navigation module, the sensor system, instructions from the fleet management module 120, the communication module, and the controller.

As described previously, each robot is configured with securable compartments. Alternately, a robot is configurable to contain a set of goods or even a mobile marketplace (similar to a mini bar at a hotel).

When a robot is assigned to a customer 202, one or more of the compartments 102, 104 is also assigned to that customer. Each of the large compartments 12 is secured separately and can securely transport goods to a separate set of customers 202.

Upon arrival of the robot to the customer destination, the customer can then open their respective compartment(s) by verifying their identity with the robot. This can be done through a wide variety of approaches comprising, but not limited to:
1. The customer can be given a PIN (e.g., 4 digit number) when they make their initial request/order. They can then enter this pin at the robot using the robot touchscreen or a keypad.
2. The customer can verify themselves using their mobile phone and an RFID reader on the robot.
3. The customer can verify themselves using their voice and a personal keyword or key phrase they speak to the robot.
4. The customer can verify themselves through their face, a government ID, or a business ID badge using cameras and facial recognition or magnetic readers on the robot.
5. The customer can verify themselves using their mobile phone; by pushing a button or predetermined code on their phone (and the system could optionally detect the customer is near the robot by using their GPS position from phone)

Controller(s) and Processor(s)

In some embodiments, each robot in the robot fleet is equipped with one or more processors 125 capable of both high-level computing for processing as well as low-level safety-critical computing capacity for controlling the hardware. The at least one processor is configured to manage the conveyance system, the navigation module, the sensor system, instructions from the fleet management module 120, the communication module and the controller.

Further still, in some embodiments, each robot in the robot fleet is equipped with a controller 150 configurable to associate each one of the securable compartments 102, 104 to an assignable customer 202 or provider 204 and provide entry when authorized.

Additional Features

In some embodiments, the robot fleet further includes at least one robot having a digital display for curated content comprising: advertisements (i.e., for both specific user and general public), including services provided, marketing/promotion, regional/location of areas served, customer details, local environment, lost, sought or detected people, public service announcements, date, time, or weather.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A computer-implemented method of providing transport services, the method comprising:
    positioning, by a server, a plurality of vehicles driven autonomously in a geographic region in anticipation of demands associated with a plurality of vendors for a plurality of products, wherein the positioning comprises:
    determining an estimated number of requests for a plurality of transport services associated with the plurality of vendors for the plurality of products for a plurality of source locations for a time of a day;
    determining a weight for each source location of the plurality of source locations based on the estimated number of requests;
    positioning the plurality of vehicles driven autonomously among the plurality of source locations based on the weight for each source location by causing navigation of the plurality of vehicles driven autonomously to the plurality of source locations in order to position the plurality of vehicles driven autonomously closest to the plurality of source locations having higher weights, wherein the plurality of vehicles driven autonomously positioned in the geographic region are included in a fleet of vehicles in the geographic region that further includes at least one vehicle remotely operated by a human and at least one fully-human driven vehicle;
    receiving, at the server, a request for a transport service;
    determining, by the server, parameters for the transport service, wherein the parameters include a service-level agreement specifying that the plurality of vehicles driven autonomously are to provide a particular transport service for a particular product of a particular vendor that is different from transport services for other products associated with other vendors that are provided by other vehicles of the fleet of vehicles in the geographic region;
    identifying, by the server, for the fleet of vehicles, an available vehicle remotely operated by a human, an available fully human-driven vehicle, and an available vehicle driven autonomously of the plurality of vehicles driven autonomously positioned in the geographic region as being available for dispatch from the geographic region;
    selecting, by the server, based on the parameters, to dispatch one vehicle from among:
    the available vehicle remotely operated by a human, the available fully human-driven vehicle, and the available vehicle driven autonomously of the plurality of vehicles driven autonomously positioned in the geographic region, wherein the selecting includes selecting the available vehicle driven autonomously based on the service-level agreement specifying that the plurality of vehicles driven autonomously are to provide the particular transport service for the particular product of the particular vendor being requested;
    and dispatching the vehicle driven autonomously selected for the particular transport service by generating and transmitting, at least in part by a communications interface of the server, a message to the vehicle driven autonomously selected for the particular transport service, wherein the message comprises vehicle command instructions causing performance of at least a portion of the transport service by the vehicle driven autonomously selected for the transport service, wherein causing the performance comprises causing navigation of the vehicle driven autonomously selected for the transport service along one or more paths through performance of the transport service.

2. The computer-implemented method of claim 1, wherein the parameters further include at least one of, distance, location, a customer's preference, size of a requested good, weight of a requested good, time, optimal delivery route, speed limit, or weather or road conditions at or en route the location of a customer receiving the particular transport service.

3. The computer-implemented method of claim 1, further comprising monitoring the vehicle driven autonomously selected for the particular transport service that is performing the particular transport service.

4. The computer-implemented method of claim 1, further comprising:
    receiving, at the communications interface of the server, a message that the vehicle driven autonomously selected for the particular transport service has completed performing the particular transport service;
    and identifying the vehicle driven autonomously selected for the particular transport service as being available for performing another requested transport service.

5. The computer-implemented method of claim 1, further comprising transmitting, by the communications interface of the server, information regarding the request for the transport service to a service provider.

6. The computer-implemented method of claim 1, further comprising:

determining requests for multiple transport services from multiple customers located within a predefined proximity of each other;

and determining one or more paths to deliver the multiple transport services to the multiple customers using the vehicle driven autonomously selected for the particular transport service.

7. The computer-implemented method of claim 1, wherein the positioning is further performed in anticipation of a known demand for the particular transport service that is anticipated to occur within one hour of the positioning.

8. The computer-implemented method of claim 1, wherein the plurality of vehicles driven autonomously are positioned proportionally among the plurality of source locations based on the weight for each source location of the plurality of source locations in order to provide optimal coverage of the plurality of source locations by the plurality of vehicles driven autonomously according to the weight for each source location of the plurality of source locations.

9. The computer-implemented method of claim 1, wherein the selecting is further based on the vehicle driven autonomously selected for the particular transport service displaying an external identifier indicating at least one of the particular product or the particular vendor for the particular transport service.

10. The computer-implemented method of claim 9, wherein the external identifier is a logo indicating at least one of the particular product or the particular vendor for the particular transport service.

11. The computer-implemented method of claim 9, wherein the service-level agreement further specifies an immediate dedicated rush service for the particular product of the particular vendor.

12. A system comprising:
a portal or communications interface configured to receive a request for a transport service and the communications interface configured to transmit information regarding progress of the transport service, wherein the request includes scheduling information;
one or more processors;
and a memory having stored thereon instructions which, when executed by the one or more processors, cause the system to:
position a plurality of vehicles driven autonomously in a geographic region in anticipation of demands associated with a plurality of vendors for a plurality of products, wherein to position the plurality of vehicles driven autonomously causes the system to:
determine an estimated number of requests for a plurality of transport services associated with the plurality of vendors for the plurality of products for a plurality of source locations for a time of a day;
determine a weight for each source location of the plurality of source locations based on the estimated number of requests;
position the plurality of vehicles driven autonomously among the plurality of source locations based on the weight for each source location by causing navigation of the plurality of vehicles driven autonomously to the plurality of source locations in order to position the plurality of vehicles driven autonomously closest to the plurality of source locations having higher weights, wherein the plurality of vehicles driven autonomously positioned in the geographic region are included in a fleet of vehicles in the geographic region that further includes at least one vehicle remotely operated by a human and at least one fully-human driven vehicle;
determine parameters for the transport service based on the request, wherein the parameters include a service-level agreement specifying that the plurality of vehicles driven autonomously are to provide a particular transport service for a particular product of a particular vendor that is different from transport services for other products associated with other vendors that are provided by other vehicles of the fleet of vehicles in the geographic region;
identify, for the fleet of vehicles, an available vehicle remotely operated by a human, an available fully human-driven vehicle, and an available vehicle driven autonomously of the plurality of vehicles driven autonomously positioned in the geographic region as being available for dispatch from the geographic region;
select based on the parameters, to dispatch one vehicle from among:
the available vehicle remotely operated by a human, the available fully human-driven vehicle, and the available vehicle driven autonomously of the plurality of vehicles driven autonomously positioned in the geographic region, wherein the available vehicle driven autonomously is selected based on the service-level agreement specifying that the plurality of vehicles driven autonomously are to provide the particular transport service for the particular product of the particular vendor being requested;
and dispatch the vehicle driven autonomously selected for the particular transport service by generating and transmitting, at least in part by the communications interface, a message to the vehicle driven autonomously selected for the particular transport service, wherein the message comprises vehicle command instructions that cause performance of at least a portion of the transport service by the vehicle driven autonomously selected for the transport service that causes navigation of the vehicle driven autonomously selected for the transport service along one or more paths through performance of the transport service.

13. The system of claim 12, wherein the parameters further include at least one of:
distance, location, a customer's preference, size of a requested good, weight of a requested good, time, optimal delivery route, speed limit, or weather or road conditions at or en route the location of a customer receiving the particular transport service.

14. The system of claim 12, wherein the instructions, when executed by the one or more processors, further cause the one or more processors to monitor the vehicle driven autonomously selected for the particular transport service that is performing the transport service.

15. The system of claim 12, wherein the scheduling information includes repeat deliveries.

16. The system of claim 12, wherein the instructions, when executed by the one or more processors, further cause the system to:
receive a message that the vehicle driven autonomously selected for the particular transport service has completed performing the transport service;
and identify the vehicle driven autonomously selected for the particular transport service as being available for performing another transport service.

17. The system of claim 12, wherein the instructions, when executed by the one or more processors, further cause the system to transmit information regarding the request for the transport service to a service provider.

18. The system of claim 12, wherein the instructions, when executed by the one or more processors, further cause the system to:

determine multiple requests for multiple transport services from multiple customers located within a predefined proximity of each other;

and determine one or more paths to deliver the multiple transport services to the multiple customers using the vehicle driven autonomously selected for the particular transport service.

19. A computer-implemented method, comprising:

positioning, by a server, a plurality of vehicles driven fully-autonomously and semi-autonomously in a geographic region in anticipation of demands associated with a plurality of vendors for a plurality of products, wherein the positioning comprises:

determining an estimated number of requests for a plurality of transport services associated with the plurality of vendors for the plurality of products for a plurality of source locations for a time of a day;

determining a weight for each source location of the plurality of source locations based on the estimated number of requests;

and positioning the plurality of vehicles driven fully-autonomously among the plurality of source locations according based on the weight for each source location by causing navigation of the plurality of vehicles driven fully-autonomously to the plurality of source locations in order to position the plurality of vehicles driven fully-autonomously closest to the plurality of source locations having higher weights, wherein the plurality of vehicles driven fully-autonomously positioned in the geographic region are included in a fleet of vehicles in the geographic region that further includes at least one vehicle driven semi-autonomously and at least one fully-human driven vehicle;

receiving, at the server, a request for a transport service;

determining, by the server, parameters for the transport service, wherein the parameters include a service-level agreement specifying that the plurality of vehicles driven fully-autonomously are to provide a particular transport service for a particular product of a particular vendor that is different from transport services for other products associated with other vendors that are provided by other vehicles of the fleet of vehicles in the geographic region;

identifying, by the server, for the fleet of vehicles, an available vehicle driven semi-autonomously, an available fully human-driven vehicle, and an available vehicle driven fully-autonomously of the plurality of vehicles driven fully-autonomously positioned in the geographic region as being available for dispatch;

selecting, by the server, based on the parameters, to dispatch one vehicle from among:

the available vehicle driven semi-autonomously, the available fully human-driven vehicle, and the available vehicle driven fully-autonomously of the plurality of vehicles driven fully-autonomously positioned in the geographic region, wherein the selecting includes selecting the available vehicle driven fully-autonomously based on the service-level agreement specifying that the plurality of vehicles driven fully-autonomously are to provide the particular transport service for the particular product of the particular vendor being requested;

and dispatching the vehicle driven fully-autonomously selected for the particular transport service by generating and transmitting, at least in part by a communications interface of the server, a message to the vehicle driven fully-autonomously selected for the particular transport service, wherein the message comprises vehicle command instructions causing performance of at least a portion of the transport service by the vehicle driven fully-autonomously selected for the transport service, wherein causing the performance comprises causing navigation of the vehicle driven fully-autonomously selected for the transport service along one or more paths through performance of the transport service.

20. The computer-implemented method of claim 19, wherein the parameters further include at least one of:

distance, location, a customer's preference, size of a requested good, weight of a requested good, time, optimal delivery route, speed limit, or weather or road conditions at or en route the location of a customer receiving the particular transport service.

* * * * *